United States Patent [19]
Hassett

[11] Patent Number: 5,347,274
[45] Date of Patent: Sep. 13, 1994

[54] HAZARDOUS WASTE TRANSPORT MANAGEMENT SYSTEM

[75] Inventor: John J. Hassett, Marblehead, Mass.

[73] Assignee: AT/COMM Incorporated, Marblehead, Mass.

[21] Appl. No.: 945,534

[22] Filed: Sep. 16, 1992

Related U.S. Application Data

[63] Continuation-in-part of Ser. No. 901,277, Jun. 19, 1992, and a continuation-in-part of Ser. No. 901,278, Jun. 19, 1992, Pat. No. 5,289,183, which is a continuation-in-part of Ser. No. 525,103, May 17, 1990, Pat. No. 5,144,553.

[51] Int. Cl.⁵ .......................................... G08G 1/123
[52] U.S. Cl. .................................... 340/988; 340/989; 342/457; 364/449; 364/460
[58] Field of Search ............... 340/988, 989, 990, 993, 340/994, 933, 438, 440, 901; 364/424.01, 424.04, 436, 443, 460, 449; 342/457

[56] References Cited

U.S. PATENT DOCUMENTS

| | | | |
|---|---|---|---|
| 3,602,881 | 8/1971 | Bayne . | |
| 3,646,580 | 2/1972 | Fuller et al. | 340/989 |
| 4,009,375 | 2/1977 | White et al. | 340/988 |
| 4,031,513 | 6/1977 | Simciak . | |
| 4,104,630 | 8/1978 | Chasek . | |
| 4,303,904 | 12/1981 | Chasek . | |
| 4,338,587 | 7/1982 | Chiappetti . | |
| 4,481,428 | 11/1984 | Charlot, Jr. | 307/219.1 |
| 4,501,958 | 2/1985 | Glize et al. | 235/382 |
| 4,555,618 | 11/1985 | Riskin | 235/384 |
| 4,651,157 | 3/1987 | Gray et al. | 340/539 |
| 4,786,903 | 11/1988 | Grindahl et al. | 340/825.54 |
| 4,831,539 | 5/1989 | Hagenbuch | 340/988 |
| 4,884,208 | 11/1989 | Marinelli et al. | 364/460 |
| 4,897,642 | 1/1990 | DiLullo et al. | 340/988 |
| 4,916,296 | 4/1990 | Streck | 235/454 |
| 4,937,581 | 6/1990 | Baldwin et al. | 342/44 |
| 5,014,206 | 5/1991 | Scribner et al. | 364/449 |
| 5,144,553 | 9/1992 | Hassett et al. | 340/928 |
| 5,155,689 | 10/1992 | Wortham | 364/449 |

FOREIGN PATENT DOCUMENTS

58-222369 12/1983 Japan .
159526 7/1987 Japan .
01259484 10/1989 Japan .

OTHER PUBLICATIONS

Desmond, "Toll Booth Net Automates Fare Collection Saves Cash", Network World, vol. 6, No. 23, pp. 4–6, Jun. 12, 1989.
Encyclopedia of Computer Science and Engineering, Van Norstrand Reinhold Company, Inc., 1983, pp. 563–565.

Primary Examiner—Brent Swarthout
Attorney, Agent, or Firm—Lahive & Cockfield

[57] ABSTRACT

A hazardous waste shipment system provides monitoring and control to verify the location and condition of each shipment. Two-way base stations receive status and identification signals from vehicle-mounted transponders as the shipments pass by, and the base stations relay the information to a central data bank. The vehicle mounted transponders may receive data from sensors that monitor the load, and may actuate alarms or a message display for operator intervention. The three-tier system also provides notifications, and safety instructions in the event of a mishap, with the base stations relaying instructions or route changes to the vehicle mounted transponders.

18 Claims, 5 Drawing Sheets

HAZARDOUS WASTE TRANSPORT MANAGEMENT SYSTEM

REFERENCE TO RELATED APPLICATIONS

The subject matter of this application is related to and is a continuation-in-part of copending U.S. patent application Ser. No. 901,277 filed Jun. 19, 1992, entitled Traffic Monitoring and Management Method and Apparatus and also of U.S. patent application Ser. No. 901,278 filed Jun. 19, 1992, entitled Object Location Process and Apparatus now U.S. Pat. No. 5,289,183, which is a continuation-in-part of Ser. No. 525,103 filed May 17, 1990, and now U.S. Pat. No. 5,144,553. These patent applications are assigned to the assignee of the present application, and the texts thereof are hereby incorporated herein by reference in their entirety.

BACKGROUND OF THE INVENTION

The present invention relates generally to systems for traffic and load monitoring and management. More particularly, it relates to apparatus and method for utilizing a two-way radio transponder to accurately and automatically determine the location of a vehicle and the condition of its load as it traverses the countryside, via a roadway, railway, bridge, tunnel, canal or other fixed bed transport path.

An increasing number of vehicles loaded with hazardous waste are traveling over progressively more congested transportation networks. In order to improve the efficiency of transportation, management systems have long been employed to optimize the capabilities of a private or specialized transport operation, such as a rail system or trucking operation. However, waste disposal has historically been subject to far less control and accountability than have commercial freight operations.

Hazardous materials are transported daily along roads, bridges, tunnels, and along railways and waterways, via diverse modes of transport. This presents the public at large, and the specific individuals involved, including emergency personnel and drivers of vehicles loaded with hazardous materials, with the possibility of significant risk in the case of traffic accidents and accidental leakage or rupture of a hazardous material container. Historically, methods of identifying and managing hazardous material transport are unsophisticated, being in most cases manually managed. For example, the driver of a truck carrying hazardous waste will generally hand over shipping papers or waste disposal licenses, will manually inspect the cargo during shipment, and will telephone or otherwise personally maintain contact with his carrier organization during travel or after its completion.

A method of electronically marking, identifying and managing hazardous cargo and vehicles could decrease the risk to the general public and might cost-effectively provide detailed information on hazardous cargo, status and route. Such information would also enhance safety measures for emergency personnel called to handle an accidental rupture of a hazardous material container.

In prior art transport management systems such as freight systems, the considerations of dispatching and tracking have been implemented primarily with regard to initially setting up shipping routes and delivery times to optimize efficiency of loading and traveling, and to confirm delivery after a shipment has been received, or been logged in at a transshipment point such as a trucking yard or warehouse.

Systems of this type are ill suited to hazardous waste hauling, wherein it would be advantageous to not only verify receipt or delivery of the load at an end point, but also to verify compliance, and to generate reports on the identity and physical condition of the load at a number of intermediate points, or even continuously, in transit.

Accordingly, an improved system is needed.

SUMMARY OF THE INVENTION

A system according to the present invention for managing shipments of hazardous waste includes a novel system of sensors, transponders, and a data system linked together to provide management, e.g., tracking, warning and reporting of waste vehicle identity, location, and status, during shipment.

The system includes three basic elements, or levels of equipment. First, a mobile, vehicle-borne radio transceiver unit incorporates a processor, a memory, and a user interface, e.g., a display, a key pad and an audio speaker. Second, a series of portable and/or fixed base station transceiver units are strategically located at dispatch centers, check points and elsewhere along transit routes. Third, a data management network bidirectionally communicates, through the base stations, with the mobile units. Mobile units may be portable, such that a driver of a vehicle carrying or pulling a hazardous material container can place it on the dashboard of the vehicle, or it may be permanently affixed either to the vehicle, or to a specific hazardous material container, such as a rail container, tank trailer or intermodal shipping container.

The mobile unit residing in or on a vehicle or container is preferably programmed, via radio communications, with the identity of the hazardous material it is then containing. This information may include, in addition to a detailed identification, other pertinent information such as material handling specifics, recommended antidotes for exposure to the material, special contact sources, statutory waste disposal license number, and phone numbers. Optionally, sensors are connected to or located in the material container, to measure pressure or other attributes indicating a load condition, such as leakage, which is to be monitored. The sensors may be hard-wired to the mobile unit, but preferably are equipped with radio transmitters that transmit the sensor readings to the mobile unit on the vehicle/container to provide it with their load status information. This information is retained in memory by the mobile unit, and communicated to a driver via an audio/visual display, or communicated to an on-route base station as the container and its mobile unit pass by. In the event that the driver is alerted of a leak, he/she may then take requisite action. When a base station transceiver receives a warning alert, that station sends a message to the database management system/network, which is programmed to then notify the managing carrier.

In addition to message communications initiated by cargo-monitoring sensors, at any time, a mobile unit may be interrogated (read) to ascertain the hazardous cargo information initially written or updated in it. The memory contents are read initially at a dispatch center to confirm proper programming, and may be queried en route by queries transmitted from the fixed base stations, or from a mobile radio transceiver unit. In the case of an accident and rupture of a hazardous material container, first-on-scene emergency personnel can also interrogate the respective mobile unit attached to the vehicle or container while it remains many hundreds of feet away to acquire necessary information to properly and safely handle the accident. The periodic placement of on route base stations in conjunction with the database/network system thus provides a tracking and information method for detailed management of the overall transport and handling of hazardous cargo.

In addition, the fixed base stations may transmit data to re-write the memory contents of the vehicle unit, to provide operator warning messages, and to communicate route changes.

BRIEF DESCRIPTION OF THE DRAWINGS

The various aspects and advantages of this invention will be more fully understood from a consideration of the following detailed description, in conjunction with the accompanying drawings of an illustrative embodiment, wherein.

DETAILED DESCRIPTION OF THE INVENTION

A system in accordance with the present invention includes a data management system in communication with a plurality of fixed base units located along and at ends of a shipping route, and a plurality of mobile transponder units, which are located in shipping vessels or vehicles. These elements may be thought of as levels of a system, with the vehicle or vessel located at the lowest level, and the central computer or data network at the highest level. Each level is preferably capable of two-way communication and of data storage, although the type and organization of data communication differs in each.

The invention contemplates embodiments adapted to all modes of transport—e.g., air, water, rail or roadway, but for clarity of illustration, all Figures herein illustrate a truck/highway embodiment of a hazardous waste management system. It will be understood, however, that the term "vehicle" as used in the disclosure and the patent claims herein is to include boat, airplane, truck, rail car or engine, and all other forms of transport vehicle, as well as such tanks, containers or vessels as may demountably attach to or be carried by a transport vehicle.

Figure 1:
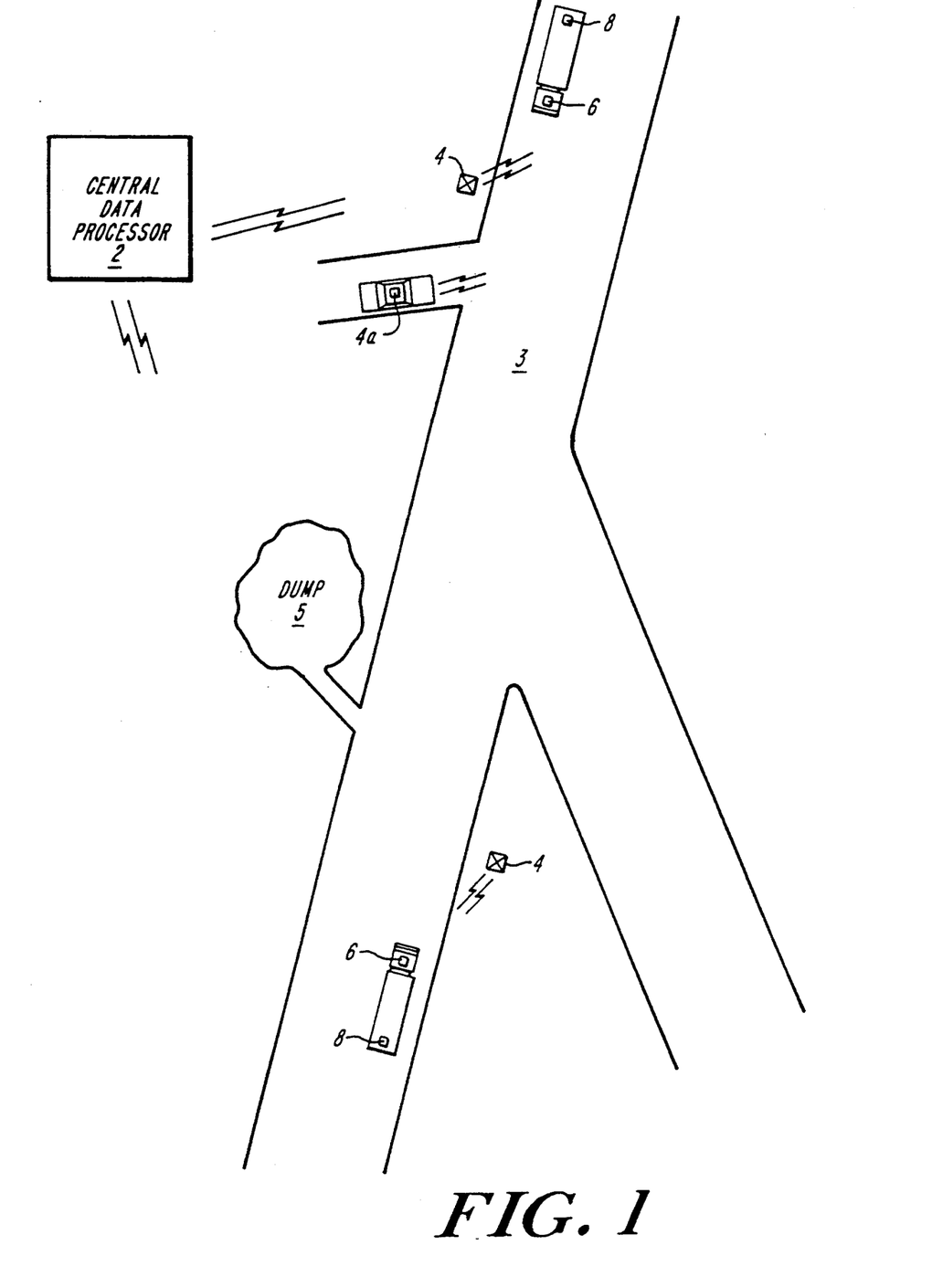
FIG. 1 is a schematic depiction of a system according to the present invention adapted for truck transport of hazardous waste.

As shown in FIG. 1, a system 10 according to the present invention includes a waste management data processor 2 that is in two-way communication with a plurality of local site modules 4 each of which is located along a highway 3 or at a check point or waste handling site, such as a dump 5, transfer station or reprocessing plant. The module 4 serves as beacon to identify to the vehicle its present location, and operates as a data storage and relay unit, as described in greater detail below. Additional modules 4a may be carried by inspection vehicles rather than being mounted at fixed routes or sites, and may function to send information to or receive information from other units in the system. For example, a mobile unit may interrogate the vehicle units attached to waste containers in a trucking yard, to inventory the type and status of shipments.

Mounted on each hazardous waste transport vehicle or vessel is a transponder 6 which is activated upon receipt of a radio broadcast query and responds by communicating its identity and certain load status information to the site or beacon units 4 as it passes. Transponder 6 preferably also controls various displays and a user interface for the vehicle driver. Transponder 6 may alternatively be fixedly located on the trailer portion of the truck (e.g., on a hazardous waste tank, intermodal container or cargo trailer), in which case the driver displays need not be included.

In a preferred embodiment, one or more load sensors 8 are mounted on the vehicle to monitor the status (pressure, temperature, special reaction products or other characteristics) of a load of hazardous waste. The sensors each provide their data to the vehicle transponder 6 or 6a, either by conductive wire connection, or by short distance RF communication.

Figure 2:
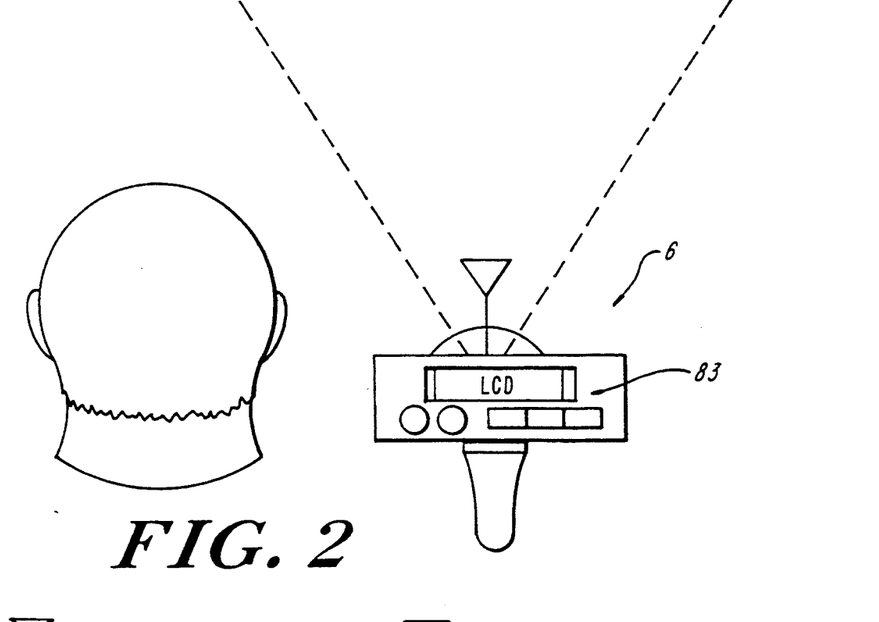
FIG. 2 is a schematic pictorial view of a mobile transceiver unit of the system of FIG. 1.

FIG. 2 shows an exemplary physical embodiment of a vehicle-mounted mobile transponder unit 6, which is preferably configured to mount on the dashboard of a vehicle where a self-contained user interface/display 83 is accessible to the vehicle driver. As shown in operative detail in FIG. 2A, the mobile transponder 6 includes an RF receiver 62 and RF transmitter 64, both connected to an antenna 63, and also includes a user interface 83 preferably with data entry pad 82, alphanumeric display 84 and an audio warning/communication transducer 86. A microprocessor 70 is connected to receive and transmit radio messages, to receive sensor data either via radio frequency transmission or through input ports 90, to control the interface 83, and to store and read data from a memory 88. One or more of the input ports 90 may receive direct data inputs from on-board load sensors, and the microprocessor uses this data to generate or update reports, or warnings, as appropriate.

Figure 2A:
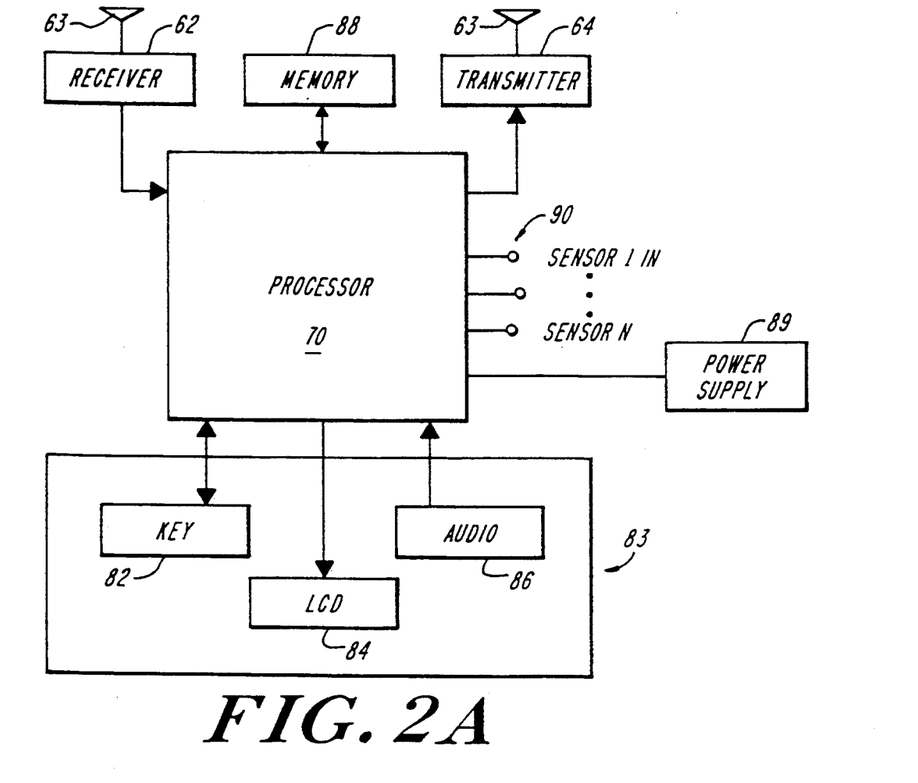
FIG. 2A is a schematic block design of the unit of FIG. 2.

The microprocessor may be a standard microprocessor chip, or may consist of or include one or more integrated circuits, microchips or other processing components, which may, moreover, be included in distinct devices or separate assemblies. For example, a so-called smart card carrying a microchip may interface with other circuit components to transfer data or instructions to or from the mobile transponder 6.

The radio transceiver apparatus itself is conventional, and will not be discussed in detail as many different implementations are possible. The above-mentioned co-owned patents and applications provide a discussion of certain antenna characteristics suitable for forming narrow beams that can quickly establish communication with particular vehicles as they speed by. Other suitable systems may provide non-directional RF communication with an effective range of many miles. In general terms, receiver 62 receives and demodulates an RF signal sent out by a nearby fixed or mobile unit (4 or 4a) to provide a binary-encoded message communication to the processor 70. Processor 70 in turn activates the transmitter 64 and controls it to send an acknowledgement and to effect two-way communication, receiving any messages which have been directed to the base unit from the central data system for relaying to the vehicle, and sending either a response, or a routine status report. When it receives communications, the microprocessor updates the memory 88 or activates the interface 83 if necessary. Communications proceed as follows.

Each mobile unit has a unique multi-digit identification number which may be fixed, or may be reassigned and programmed into memory 88 before or during each run of the vehicle. In either case, central data network 2 (FIG. 1) may contain a full data record indexed to the identification code that identifies the driver, responsible carrier, nature of the load carried by the vehicle, and its destination.

In accordance with a principal aspect of the present invention, each vehicle logs in as it passes a mobile or fixed base station 4, 4a, and the base station relays its newly received information to the network 2, which stores the record. Thus, at each time, network 2 contains current location and other information for each hazardous load being transported. In this manner, each load is tracked as it progresses along its route.

The base unit may have a short-field, highly directional RF system and may operate substantially as described in the aforesaid patent applications to communicate with passing vehicles. Depending on its location and surrounding terrain, it may communicate with the central data network 2 by microwave, satellite uplink, cellular phone or other radio communications link.

Network 2 is preferably programmed with a general purpose waste management, notification and monitoring program that compiles and updates the tracking reports for each load as it progresses along its predesignated route, preferably checks the logged-in locations for compliance with the designated route, notes any unusual indications of load status apparent from the sensor outputs, discussed below, and, if necessary, initiates communications through the fixed base modules 4 to issue inquiries, warnings, instructions or route changes to the driver. For example, when a regional flood warning or weather-related danger or traffic impediment is predicted, shipments which have been identified as particularly dangerous may be suspended or re-routed around the affected area.

Network 2 may further include routine notification and emergency warning program modules. For example, when the vehicle route runs through a community that has enacted a "right to know" law requiring the carrier to notify local officials of certain categories of waste being transported through the community, the network generates and sends the required routine notification when an identified category of load is logged in at a base module mounted by the road at the outskirts of that community. An emergency warning is generated under conditions described below, and may involve communications with the network 2, or may be initiated by the mobile unit 6.

Figure 3:
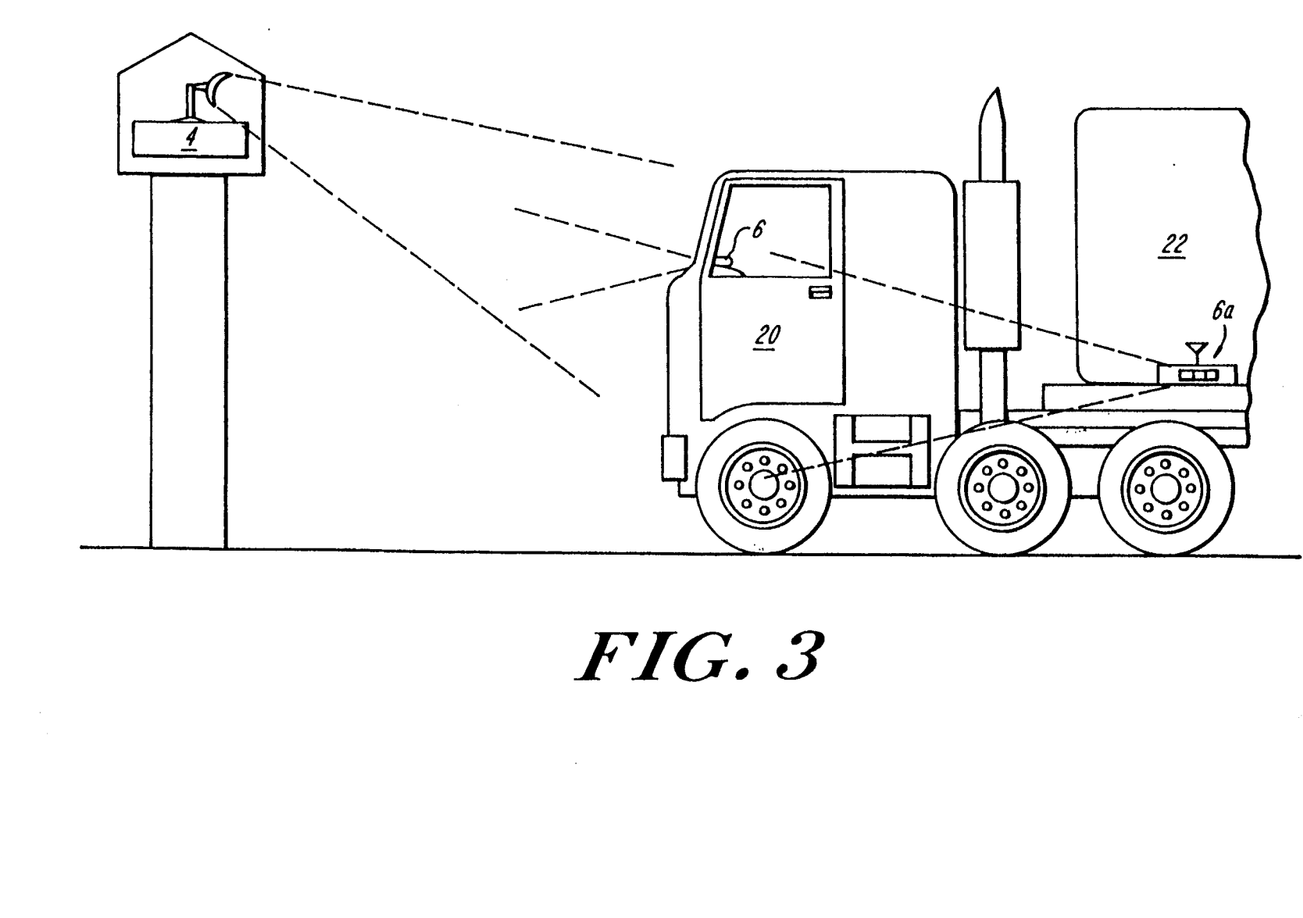
FIG. 3 is a pictorial depiction of a vehicle equipped with a mobile unit in proximity to a fixed base station transceiver unit.
Figure 3A:
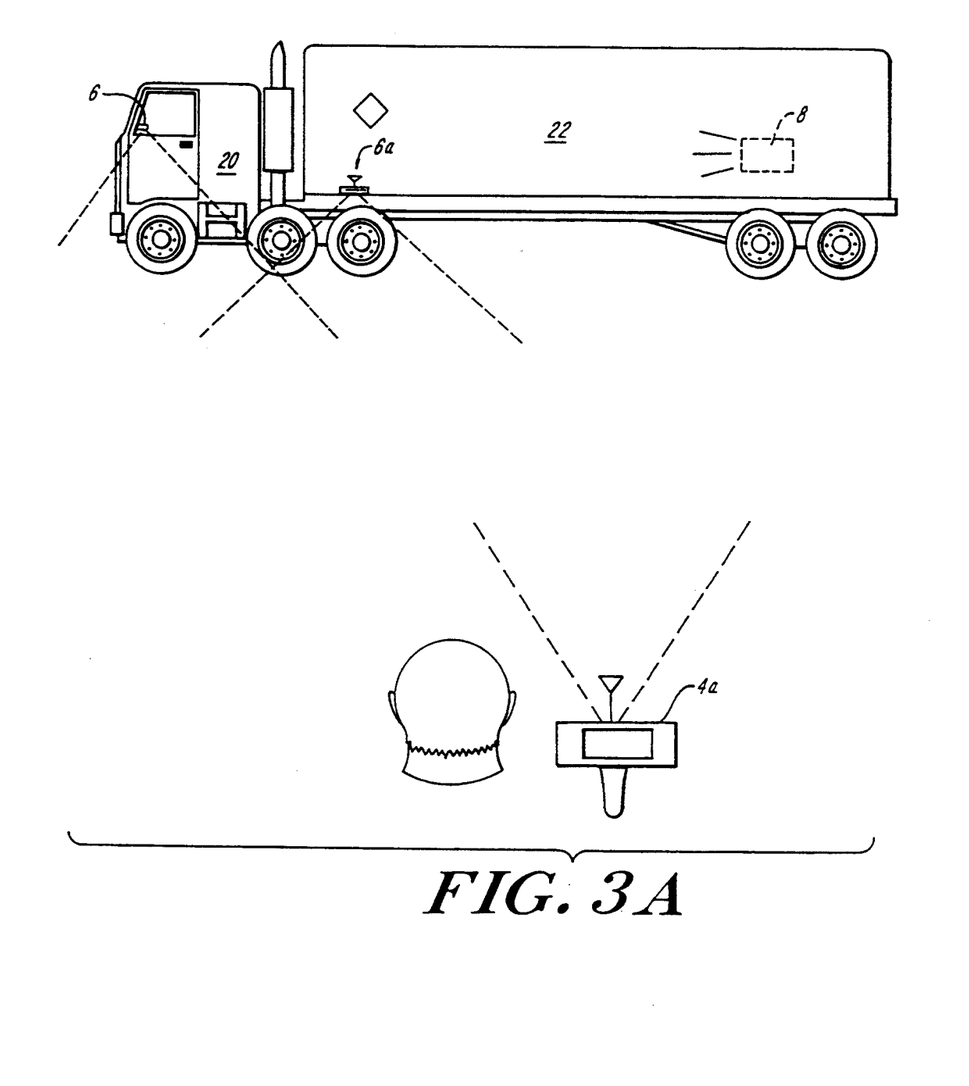
FIG. 3A is a pictorial depiction of a vehicle and container each equipped with mobile transceiver units in proximity to a mobile base station transceiver unit.

As shown in FIGS. 3 and 3A a vehicle 20 with a trailer or shipping vessel 22 has a vehicle transponder 6, and/or a vessel transponder 6A, for bidirectional radio frequency communications with one or both of the cab and the waste container so they may be monitored and receive messages even if separately routed. Associated with the vessel or cargo container 22 are a plurality of sensors 8, of which one is shown, that detect the status of the load. The sensors 8 may include heat or humidity sensors that detect dangerous environmental conditions, leakage conditions or other conditions or reaction products in the load that require monitoring. The sensors may also include security-type sensors to assure that the load remains intact until delivered to its final destination. For example, a sensor may count actuations of a purge valve in a tank vessel, or sense changes in weight of the load, to assure that the load is not diverted or dumped en route. Others specialized sensors may detect emissions or the like.

Each sensor is of a standardized type—that is, is one of a few sensors applicable to hazardous waste—and is identified by a number by which the central data system can determine the sensed condition. Preferably each sensor puts out either a two-state (on/off) signal, or a proportional type signal which is normalized to a fixed range, for example, 0 to 1 volt. Two-state sensors may be used for threshold or limit-type detectors, whereas proportional range sensors are used for continuous scale readings of conditions such as temperature, radiation level, pH or concentration level.

Figure 4:
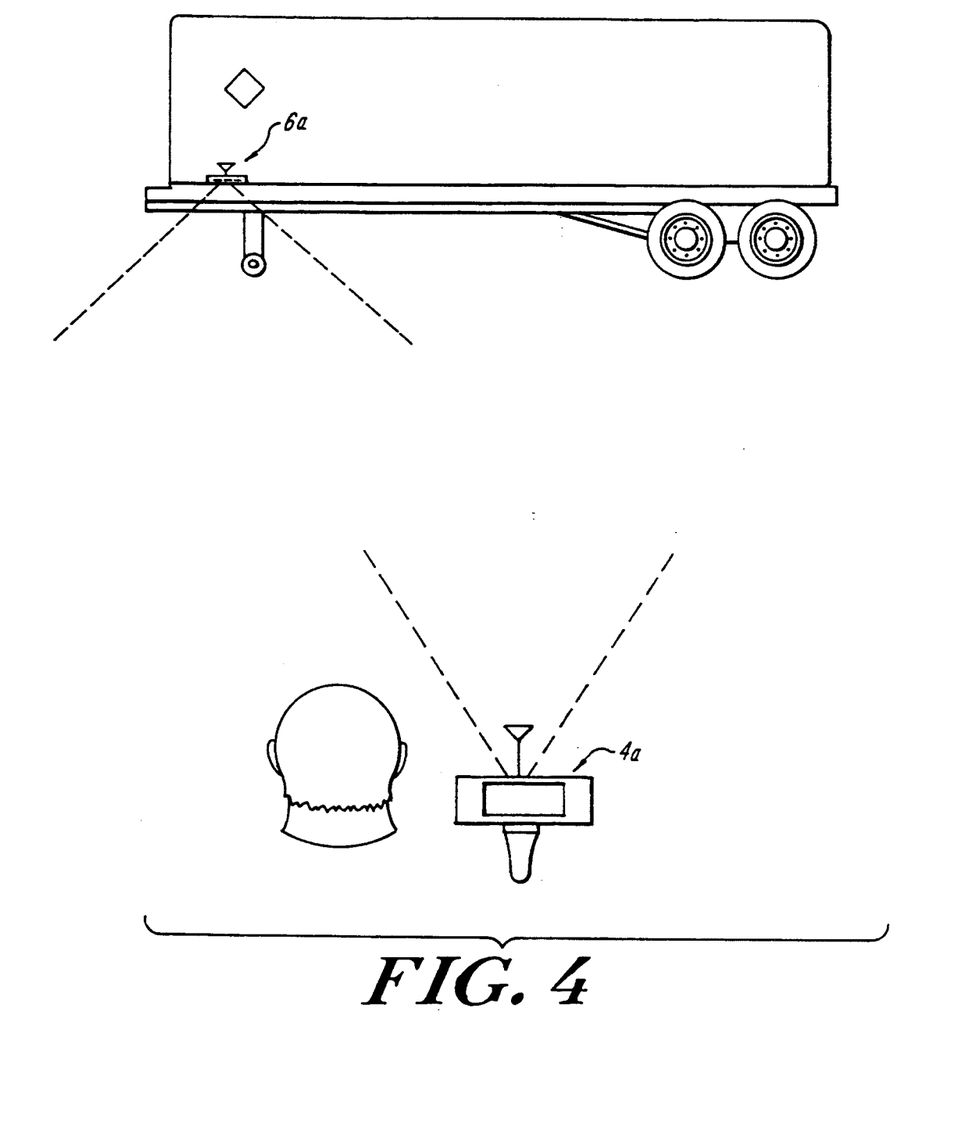
FIG. 4 is a pictorial depiction of a stationary waste container with transponder queried by a mobile base station transceiver unit.

As shown in FIG. 3, each sensor transmits its readings to be picked up by the mobile unit 6 or 6A of the vehicle. Some or all of the sensors 8 may also be hard-wired to the microprocessor 70 of the transponder, as shown in FIG. 4. In either case, the sensor signals received by the microprocessor are stored in memory as current status signals. They may also be analyzed with a load status analysis program to detect any warning or out-of-limit states requiring operator attention, or system notification. If an out-of-limit condition is found to exist, special warning data markers are stored for communication to the next site unit. Preferably, upon receiving a warning status signal, the vehicle module 6 immediately initiates correspondence with the nearest base station 4. If the condition requires operator knowledge or intervention, the user interface is also activated, to provide an alarm, a message, or both.

Preferably, the two-state sensors include sensors that detect emergency conditions, such as leak detectors, smoke detectors, or excessive heat or pressure detectors. When one of these sensors detects a fault condition, mobile unit 6 produces an audible warning to alert the driver, and preferably actuates the display with an appropriate message, such as "Fire" or "Sensor 3". The other condition sensors are associate with non-critical conditions, and their outputs are simply read and stored in memory, to be transmitted as a status record when the vehicle next passes a fixed base transponder 4.

The status record and location are then transmitted from the base transponder 4 to the data network 2, which applies an appropriate subroutine to check whether the reported data is within normal limits. By way of example, based on the vehicle location and the identified type of hazardous waste, the data network may determine that temperature reading of 130° F. represents a normal condition for a load of chemical sludge carried on a road in Kansas in July, whereas the same reading from such a load in Minnesota in March may indicate the occurrence of an exothermic reaction that requires immediate intervention. As noted above, other conditions, such as excessive pressure, may require immediate action, such as venting the waste container, and these are preferably handled as driver warnings, directly by the vehicle-mounted processor in transponder 6.

Thus, in accordance with a most basic embodiment of the invention, the vehicle units automatically log in their identification number at each fixed base station, which, in turn, relays the information to the database. Since the base stations are at fixed locations, the central data bank received both identity and location data, and each load is tracked with accuracy limited only by the spacing of base stations 4.

When the load has sensors 8 monitoring its condition the central data record further provides a time-varying record of monitored load parameters. Thus the system provides a dynamic record of waste material condition, allowing proper assessment of any irregularities. This information renders possible a much better understanding of any irregularities that result in mishaps, and allows the central computer access to a larger data set for diagnosing occurrences and determining appropriate warnings or instructions.

It will be understood that the forgoing description of the invention is made for purposes of illustration, and that the invention is not limited thereto. Being thus disclosed, variations and modifications will occur to those skilled in the art, and such variations and modifications are considered to be within the scope of the invention, as set forth in the claims to follow.

What is claimed is:

1. A system for managing vehicular transport of hazardous waste, such system comprising
   a central data handler for maintaining records of hazardous waste materials being shipped in a plurality of waste shipment vehicles in a region
   a plurality of vehicle RF transponders, each vehicle RF transponder being located on a waste shipment vehicle and including memory means for storing data, processing means for receiving and handling data, and RF transceiver means for bidirectionally communicating messages related to the data,
   a plurality of sensors on said vehicle for sensing conditions of hazardous waste material in a waste shipment which may change as said vehicle moves, said sensors sensing at least one of an environmental condition, reaction condition, leakage/emission condition and maintenance of intact hazardous waste load condition while the vehicle is in motion, and providing sensed data indicative of sensed condition to the RF transponder of such vehicle, and
   a plurality of base transponders distributed throughout the region, each base transponder including means for transmitting messages to and from the central data handler and further including RF base transceiver means for bidirectionally receiving and transmitting messages to and from each vehicle RF transponder within its range, wherein each vehicle transponder is programmed to transmit said sensed data to a base transponder, and the base transponder relays received messages to the central data handler for tracking waste shipments and condition of hazardous waste material included in each shipment as the waste shipment vehicle travels through the region near base transponder locations.

2. A system according to claim 1, wherein the waste shipment vehicle is a non-self-powered vehicle for transporting waste.

3. A system according to claim 1, wherein the waste shipment vehicle is a self-powered vehicle.

4. A system according to claim 3, wherein the vehicle transponder further includes user interface means for interfacing data to a vehicle operator.

5. A system according to claim 1, further including at least one sensor located for sensing a dangerous reaction characteristic of a waste shipment, said at least one sensor communicating sensed output data to a vehicle transponder on a vehicle carrying said waste shipment.

6. A system according to claim 5, wherein a said sensor communicates sensed output data by wired connection to the vehicle transponder.

7. A system according to claim 5, wherein a said sensor communicates sensed output data by RF communication to the vehicle transponder.

8. A system according to claim 1, wherein the central data handler maintains files indicating identity, location and status of hazardous waste shipments.

9. A system according to claim 8, wherein the central data handler generates and sends messages based on records of hazardous waste shipments.

10. A system according to claim 9, wherein a said message includes a precautionary message for safe handling of a shipment in case of accident.

11. A system according to claim 9, wherein the central data handler sends said messages to a base transponder located within radio range of a hazardous waste shipment, and the base transponder relays said messages to a vehicle transponder of a vehicle carrying said shipment.

12. A mobile vehicle transponder system for management of a shipment of hazardous waste, such vehicle transponder system including
   a plurality of sensors on said vehicle for sensing conditions of hazardous waste material in a waste shipment which may change as said vehicle moves, said sensors sensing at least one of an environmental condition, reaction condition, leakage/emission condition and maintenance of intact hazardous waste load condition while the vehicle is in motion, and providing sensed data indicative of sensed condition to the RF transponder of such vehicle and
   a vehicle-mounted unit for receiving said sensed data and having
      a radio frequency transceiver for receiving and sending digitally encoded messages identifying a shipment of hazardous waste,
      memory means for storage of data,
      processing means for effecting lag data/message conversion for messages received or transmitted via the transceiver, and
      a display for displaying data to a vehicle operator, said processing means controlling said memory and said transceiver to transmit said data from the vehicle on which the transponder is mounted as said vehicle nears each of a plurality of fixed stations, thereby providing current status information relating to the shipment of hazardous waste and to receive data for displaying on the display.

13. A system according to claim 1, wherein the central data handler includes means for analyzing waste shipment information from a waste shipment vehicle, and for sending a message related to emergency handling to a base transponder near said vehicle.

14. A system according to claim 13, wherein the central data handler includes means for analyzing data received from a base transponder to determine if physical condition of a waste shipment is within normal limits.

15. A system according to claim 5, wherein the sensed data is stored in a memory on the vehicle, and the vehicle transponder includes means for analyzing said sensed data to detect occurrence of an emergency condition.

16. A system according to claim 9, wherein a said message includes a community notification message.

17. A system according to claim 9, wherein a said message indicates that physical condition of a hazardous waste shipment is not within normal limits.

18. A mobile vehicle transponder according to claim 12, further comprising means for receiving a plurality of sensor outputs indicative of physical condition of a load of hazardous waste, and wherein said processing means includes means for analyzing the sensor outputs to detect an out of limit condition requiring a safety response.

* * * * *